A. WUNDERLICH.
SCREW PROPELLER FOR FLYING MACHINES.
APPLICATION FILED OCT. 11, 1910.

1,010,337.

Patented Nov. 28, 1911.

7 SHEETS—SHEET 1.

Witnesses:
C. H. Crawford
C. J. Dulin

Inventor,
Alfred Wunderlich
by B. Singer,
Atty.

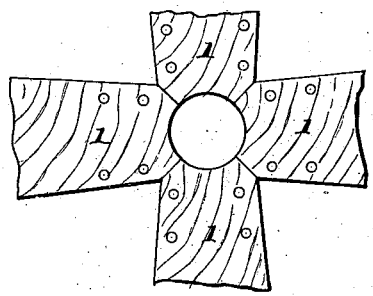
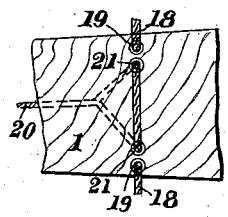
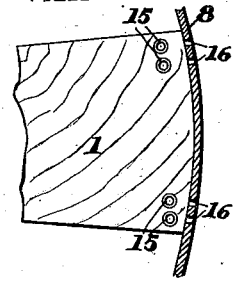
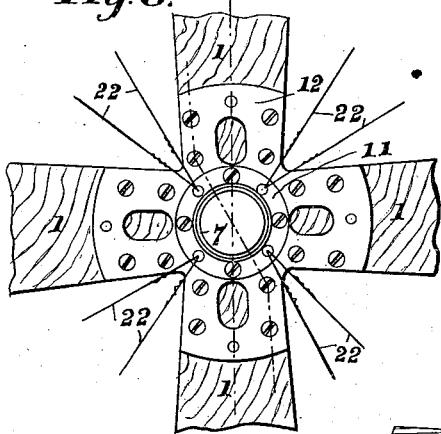
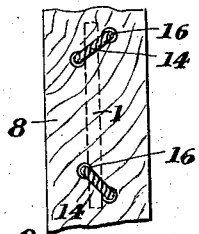
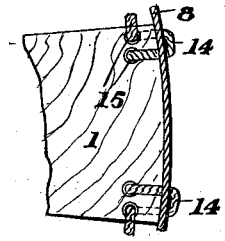
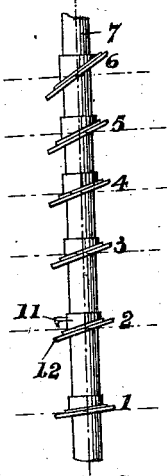
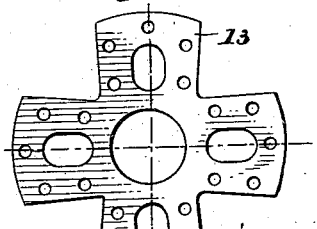
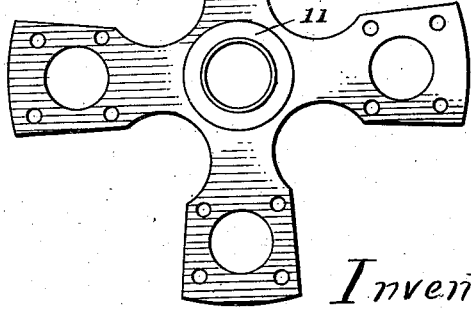

A. WUNDERLICH.
SCREW PROPELLER FOR FLYING MACHINES.
APPLICATION FILED OCT. 11, 1910.
1,010,337.
Patented Nov. 28, 1911.
7 SHEETS—SHEET 4.
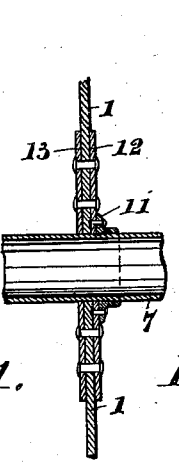
Fig. 11.
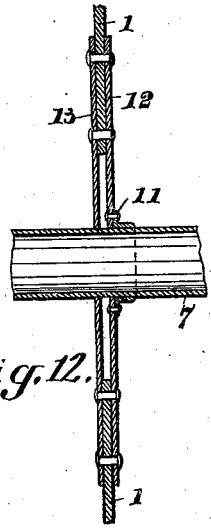
Fig. 12.
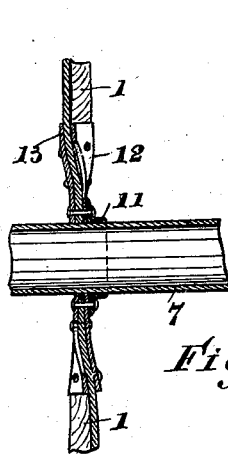
Fig. 13.
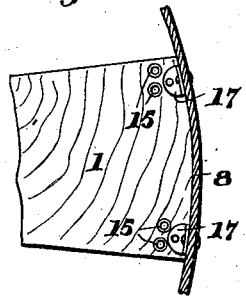
Fig. 17.
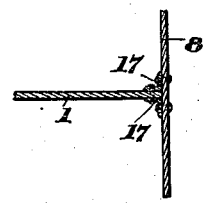
Fig. 18.
Fig. 19.
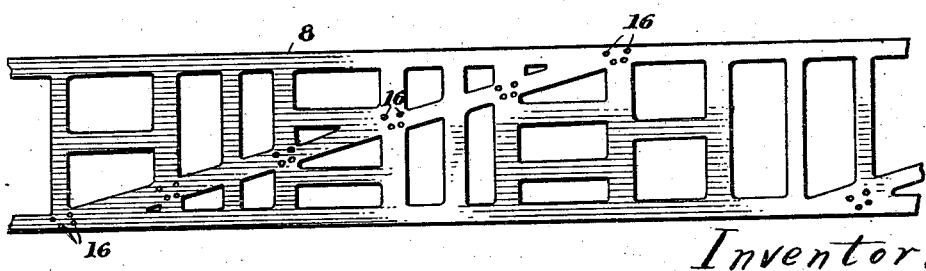
Witnesses:
C. H. Crawford
C. J. Dulin
Inventor:
Alfred Wunderlich.
by B. Singer,
Atty.
COLUMBIA PLANOGRAPH CO., WASHINGTON, D. C.

UNITED STATES PATENT OFFICE.

ALFRED WUNDERLICH, OF BRUSSELS, BELGIUM.

SCREW-PROPELLER FOR FLYING-MACHINES.

1,010,337.   Specification of Letters Patent.   Patented Nov. 28, 1911.

Application filed October 11, 1910. Serial No. 586,478.

*To all whom it may concern:*

Be it known that I, ALFRED WUNDERLICH, a subject of the German Emperor, residing at Brussels, Belgium, have invented new and useful Improvements in Screw-Propellers for Flying-Machines; and I do hereby declare the following to be a full, clear, and exact description of the same.

My present invention relates to screw-propellers for flying machines and has for its object to provide a screw the blades of which are each formed of a plurality of portions separated by open spaces or intervals, the solid portions of one blade registering with the open intervals between the portions of the next blade for the purpose of (a) dividing the air at several places in the direction of the width of the blades thereby avoiding the necessity of displacing large quantities of air; (b) enabling the screw to receive any desired number of blades without increasing the weight thereof; (c) facilitating the connection of the blades by means of hoops, and (d) enabling the screw to be rotated at higher speed without danger of its flying into pieces.

Figure 1:
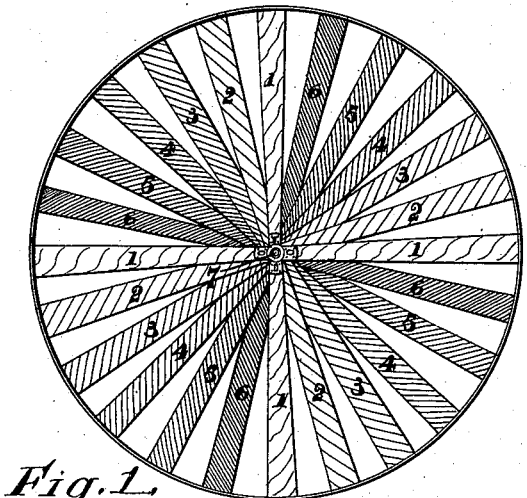
Figure 2:
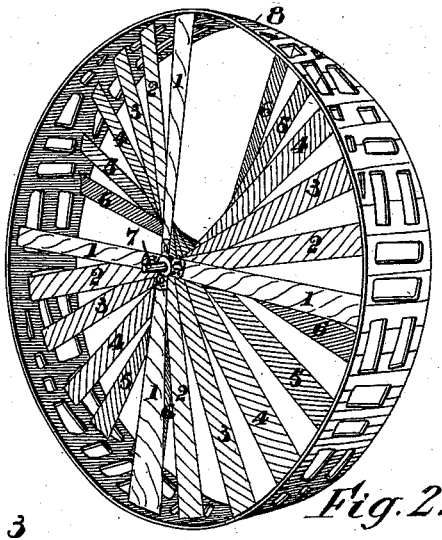
Figure 3:
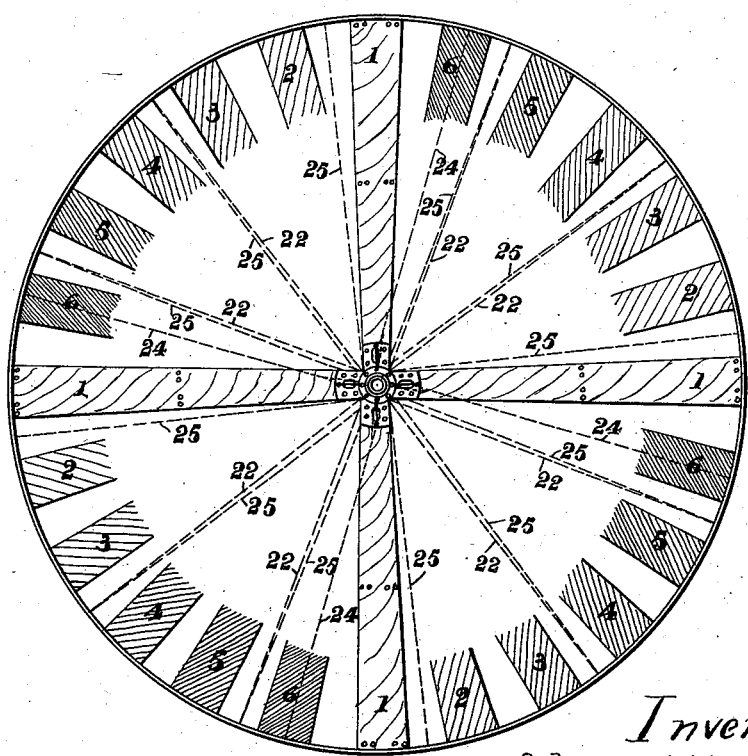
Figure 4:
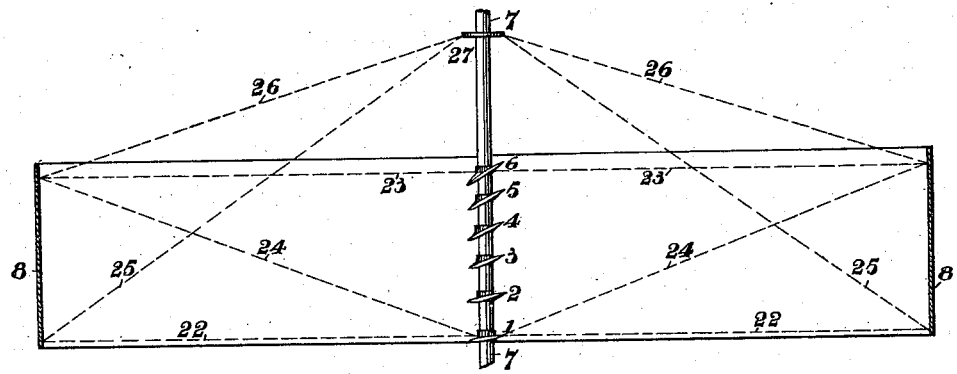
Figure 5:
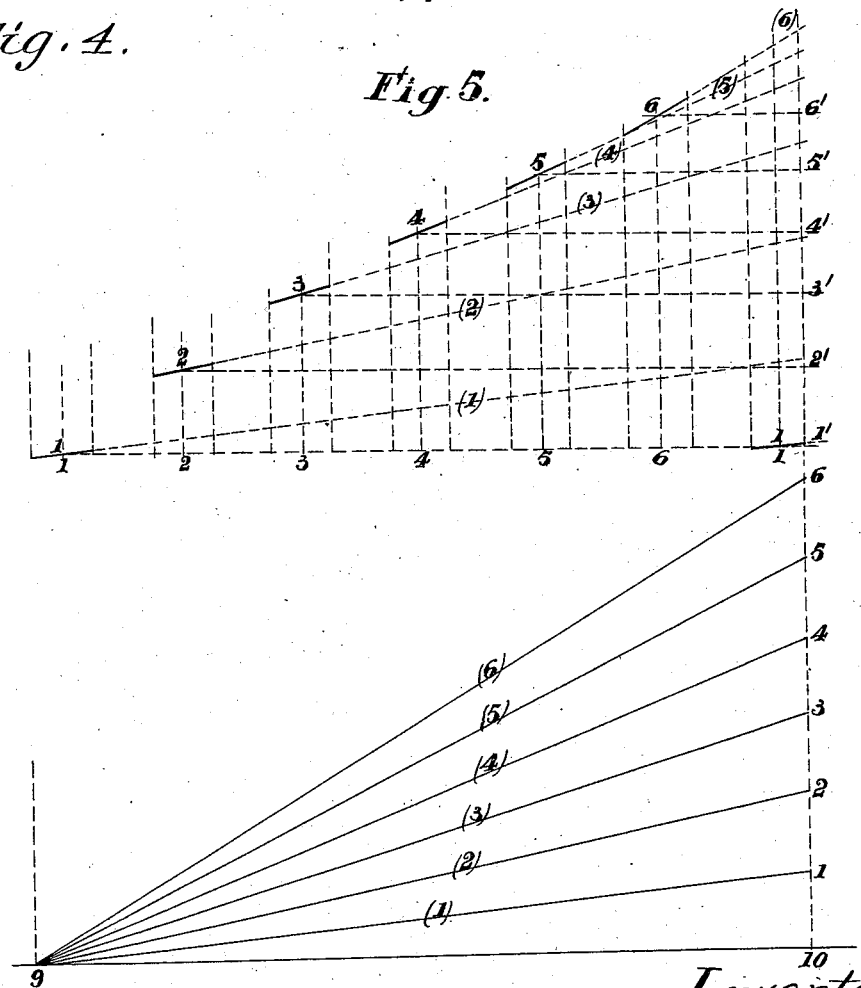
Figure 20:
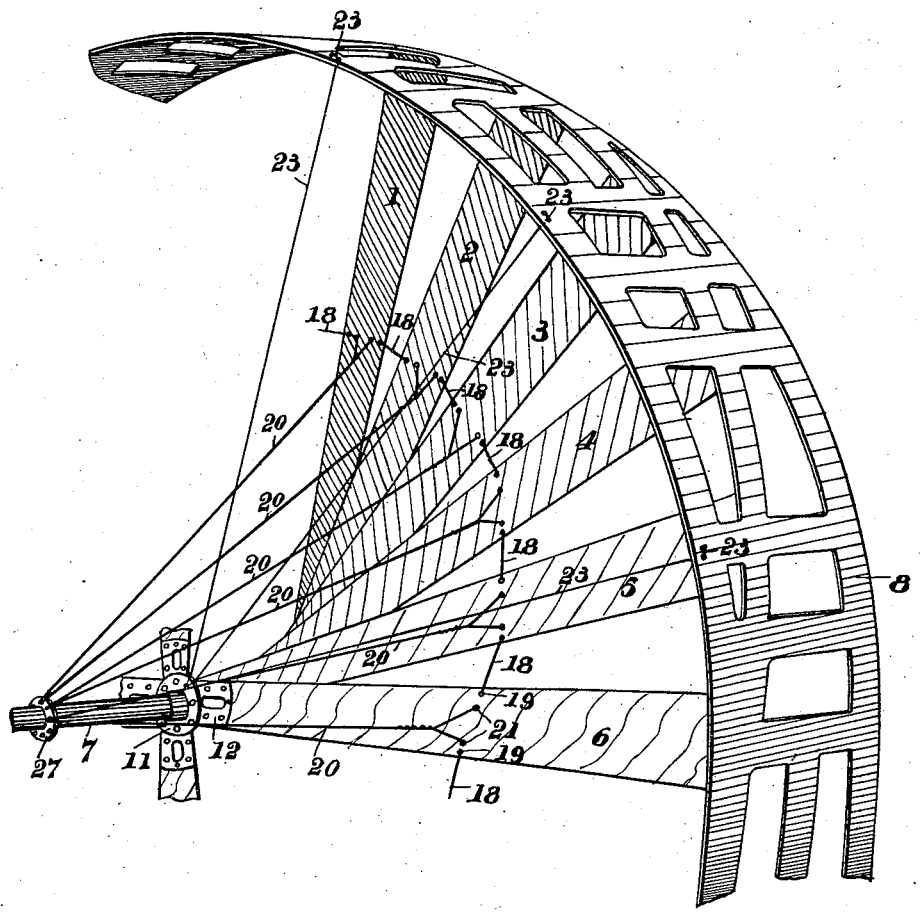
Figure 21:
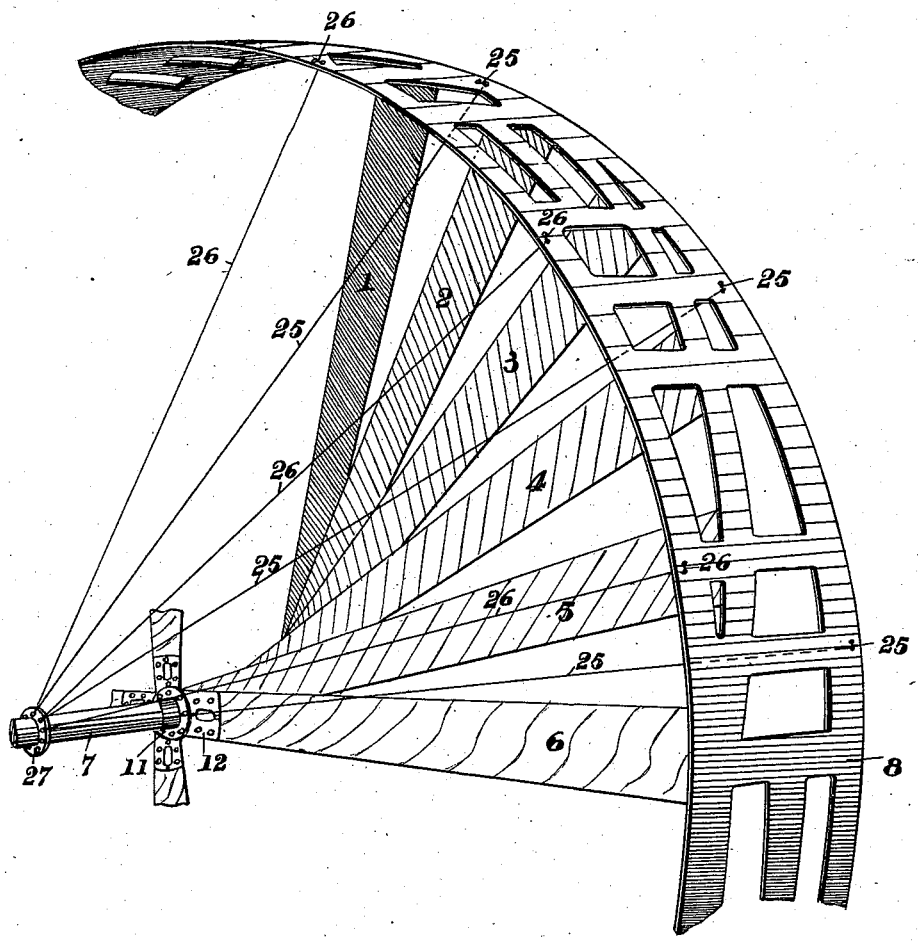
Figure 22:
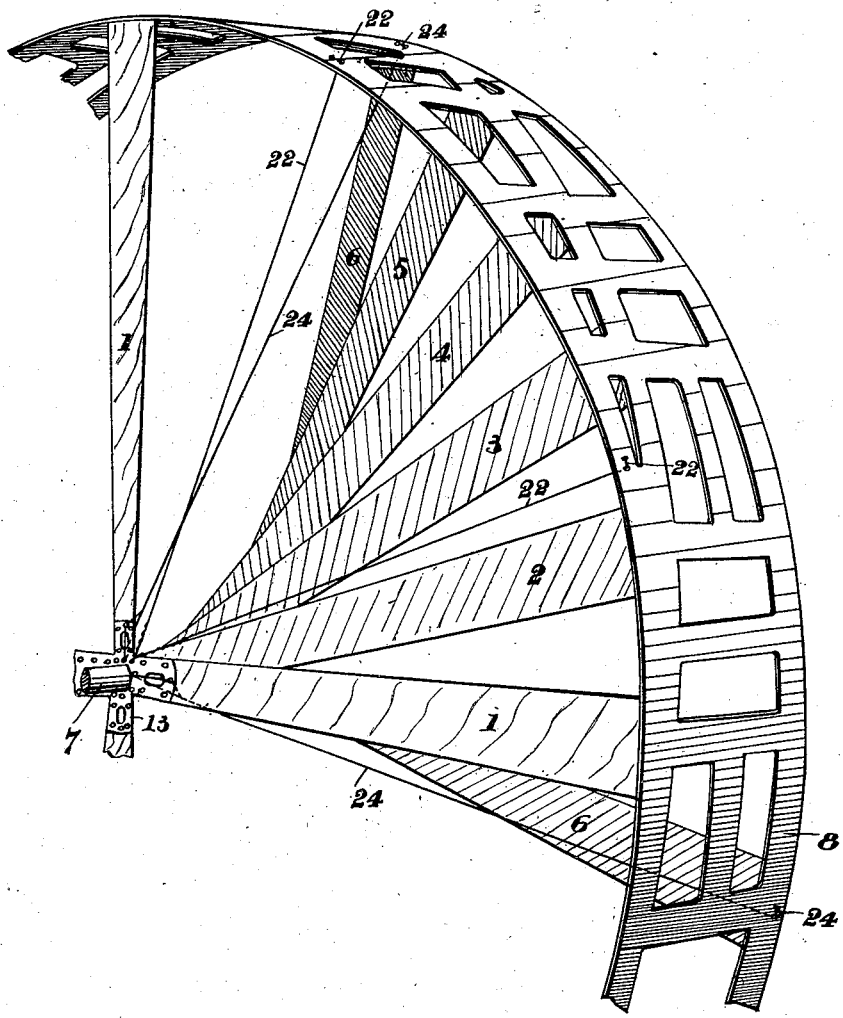

In the accompanying drawings: Figures 1 and 2 show a front elevation and perspective view respectively of my improved screw propeller formed of four times six blades; Figs. 3 and 4 show an enlarged front elevation and horizontal section respectively of the arrangement of four blades and the arrangement of six series of four blades and the connection of the outer rim with the screw-shaft by means of stretching wires; Figs. 5 and 6 show diagrammatically the pitch and intervals between the several blades; Figs. 7 to 19 show enlarged views of the details of construction; Figs. 20, 21 and 22 show perspective views of a portion of the screw illustrating the connection of the blades and rim with the shaft.

In these drawings, the blades of each series are indicated by like numerals, for instance the blades of the first series are indicated by the numerals 1, 1, 1, 1, the blades of the second series by the numerals 2, 2, 2, 2 and so on for the third, fourth, fifth and sixth series. These blades are secured at one end to the screw-shaft 7 and at the opposite end to the rim 8. The blades are separated from each other by suitable spaces which converge like the blades themselves toward the shaft 7.

The pitch of the blades 1, 2, 3, 4, 5, 6 is obtained by tracing at one end of a horizontal line 9—10 (Fig. 5) a perpendicular line 10—6 which is divided into six equal parts and connecting the points of division to the opposite end 9 of said horizontal line. Now I determine according to the compression of air to be produced for a given number of revolutions the axial distances between the centers of the blades and I mark these distances on a vertical line. In the upper portion of Fig. 5, these distances are indicated by the numerals 1′—2′, 2′—3′, 3′—4′ etc. I trace horizontal lines through the points 1′, 2′, 3′, 5′ and 6′ and these horizontal lines cross the vertical lines 1, 2, 3, 4, 5 and 6 which represent the positions of the centers of the blades with relation to their peripheral distances. The crossing points of the horizontal lines 1′, 2′, 3′. . . and the vertical lines 1, 2, 3 . . . indicate the centers of the blades 1, 2, 3. . . Now I trace through these centers short diagonal lines parallel to those marked 9—1, 9—2, 9—3 (lower portion of Fig. 5), and these short lines represent the exact pitch of each blade 1, 2, 3, 4. . .

The blades are secured to a hollow shaft 7 by means of a suitable ring 11 carrying four crossing arms 12, and by means of a cross-shaped backing 13. Two forms of the parts 12 and 13 are shown in Figs. 8, 9, 10, 11, 12 and 13, the form shown in Figs. 10 and 12 having the advantage of enabling the pitch to be altered by twisting the arms of the crosses.

The blades are formed of thin wood blades with front and rear cutting edges. Said blades are secured to the crosses 12, 13 by means of bolts, rivets or screws. The blades are also twisted with relation to the plane at right angles to the shaft 7; this twist corresponds to the pitch of the blade according as it appertains to the first, second etc. series.

The blades may be secured to the rim in two ways:—by means of wire 14 passing through eyelets 15, 15 embedded in the ends of the blades, and through eyelets 16 embedded in the rim 8; or by means of thin light metal angle-pieces 17 as shown in Figs. 17 and 18. These two means secure a strong connection of the blades with the rim, so that they are firmly held in their position with relation to the direction of rotation.

In order to reduce the weight of the rim, it may be apertured as shown in Figs. 19 to 22. The inner side of the rim is lined with any suitable fabric or a thin sheet or foil of light metal. Furthermore the rigidity of the blades is secured by means of stretched wires 18 passing through eyelets 19, and by means of stretched wires 20 passing through eyelets 21 and secured to a ring 27 secured to the shaft 7.

The rigidity of the rim is secured by means of wires 22 secured to the front edge of the same and to the ring 11 and crosses 12, 13 of the first series 1 of blades. The rear edge of the rim 8 is connected by means of wires 23 with the ring 11 and crosses 12, 13 of the last series 6 of blades. Furthermore said rim is connected by means of wires 25, 26 with the ring 27 secured to the shaft 7.

Having fully described my invention, what I claim and desire to secure by Letters Patent is:—

1. In a screw-propeller for flying machines, the combination with a shaft and a circular rim, of a plurality of sets of screw blades arranged in series and spaced apart upon said shaft, each set comprising a plurality of blades, the center line of the blades of each succeeding set being located in a predetermined curved line or helix described upon said rim, eyelets in the circular rim, wires passing through said eyelets to fasten the blade portions to the rim, rings with twisted crossing arms secured to the shaft, the inner ends of the blade-portions being secured to said crossing arms, and means for connecting the blades and rim with a second point of the shaft, substantially as set forth.

2. In a screw-propeller for flying machines, the combination with a shaft and a circular rim, of a plurality of sets of screw blades arranged in series and spaced apart upon said shaft, each set comprising a plurality of blades, the center line of the blades of each succeeding set being located in a predetermined curved line or helix described upon said rim, eyelets in the circular rim, wires passing through said eyelets to fasten the blade portions to the rim, rings with twisted crossing arms secured to the shaft, the inner ends of the blade-portions being secured to said crossing arms, a ring secured on the shaft outside the plane of the screw, wires extending from said ring to the blade-portions, and wires extending from said ring to the front and rear edges of the rim, substantially as set forth.

3. In a screw-propeller for flying machines, the combination with a shaft and a circular rim, of a plurality of sets of screw blades arranged in series and spaced apart upon said shaft, each set comprising a plurality of blades, the center line of the blades of each succeeding set being located in a predetermined curved line or helix described upon said rim, eyelets in the circular rim, wires passing through said eyelets to fasten the blade-portions to the rim, rings with twisted crossing arms secured to the shaft, the inner ends of the blade-portions being secured to said crossing arms, wires connecting said rings with the rim, wires connecting the blade-portions to one another, a ring secured on the shaft outside the plane of the screw, wires extending from said ring to the blade-portions, and wires extending from said ring to the front and rear edges of the rim, substantially as set forth.

In testimony whereof, I have signed my name to this specification in the presence of two subscribing witnesses.

ALFRED WUNDERLICH.

Witnesses:
CHARLES HONOLD,
GREGORY PHELAN.